United States Patent

[11] 3,583,288

[72] Inventor Donald L. Nepp
San Pedro, Calif.
[21] Appl. No. 861,682
[22] Filed Sept. 29, 1969
[45] Patented June 8, 1971
[73] Assignee Western Hydraulics, Inc.
Anaheim, Calif.

[54] COMBINED HYDRAULIC AND CONTROL MANUAL OPERATOR
10 Claims, 6 Drawing Figs.
[52] U.S. Cl. .................................................. 92/25, 92/114
[51] Int. Cl. .................................................. F01b 7/14
[50] Field of Search .................................... 92/21, 25, 29, 114

[56] References Cited
UNITED STATES PATENTS
2,744,501  5/1956  Chase et al. .................. 92/25
3,022,771  2/1962  Chase .......................... 92/25
3,401,604  9/1968  Blatt et al. .................... 92/114

Primary Examiner—Edgar W. Geoghegan
Assistant Examiner—A. M. Zupcic
Attorney—Fulwider, Patton, Rieber, Lee and Utecht ABSTRACT: A combined hydraulic and manual operator having a hydraulic actuator including a hydraulic cylinder and a piston operating between extreme retracted and extended positions and having a piston rod extending through the end of the cylinder. The piston rod is hollow and has the operator mounted therein to be manually movable between further extended and retracted positions relative thereto independent of the hydraulic actuator. The operator is normally moved between retracted and normally extended positions by the hydraulic actuator and in extended position may have a further manual extension by unlocking the operator from the piston rod and moving it manually to a further extended and locked position. The operator thus has a normally hydraulically extended position and a further extended position by manual operation. The operator has a central bore therethrough in which is disposed a locking-unlocking rod for unlocking the operator from the piston rod. The rod is first moved to unlocking position and the operator manually moved to its further extended position. Protection against accidental operation of the hydraulic system to retract while the operator is in manual extended position is provided by an element which is normally inoperative, but which upon the application of retracting pressure maintains locking of the hydraulic system in extended position.

PATENTED JUN 8 1971

INVENTOR.
DONALD L. NEPP
BY Fulwider, Patton, Rieber, Lee, and Utecht
ATTORNEYS

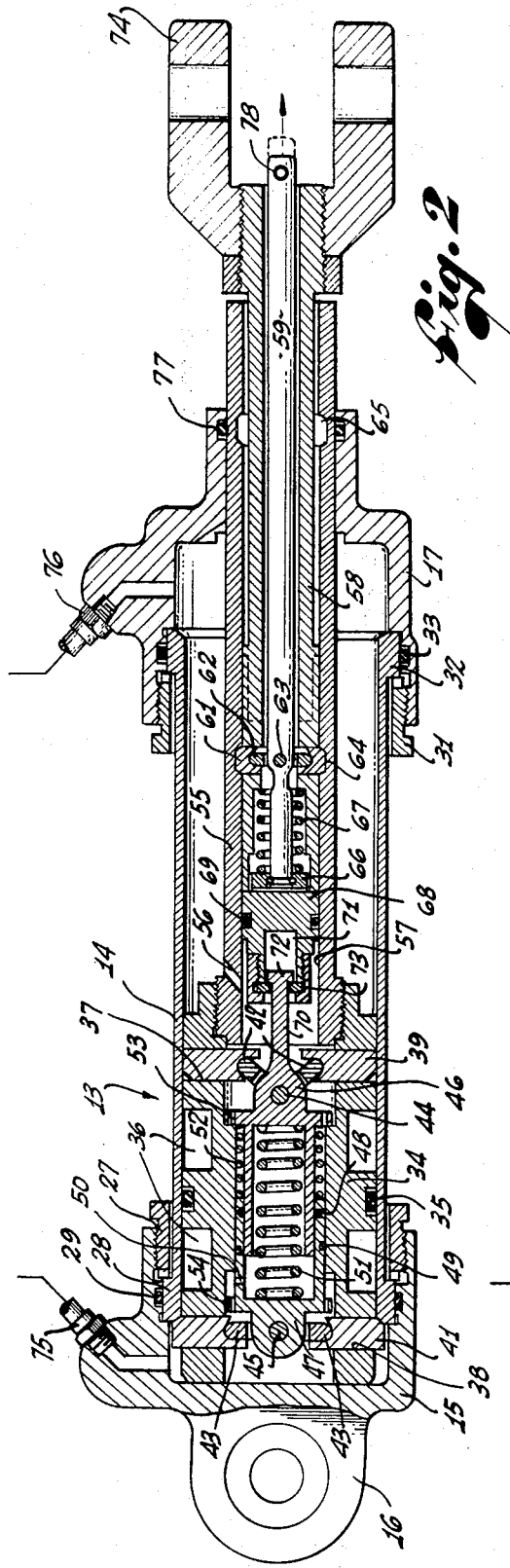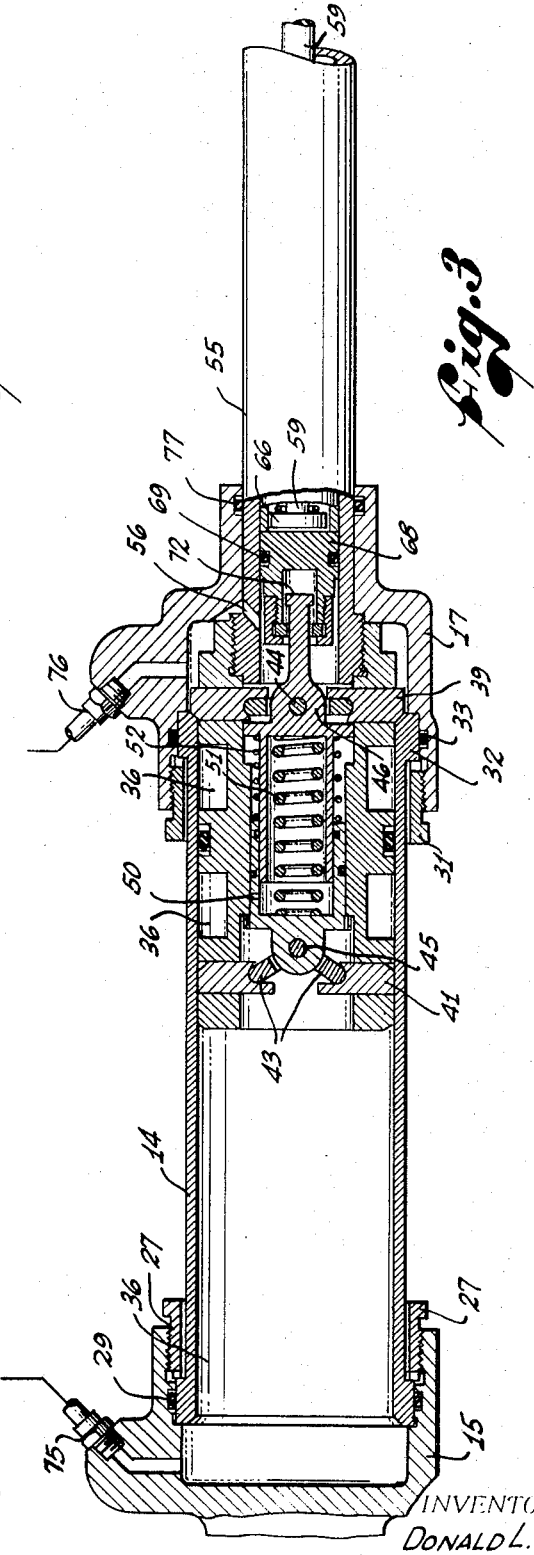

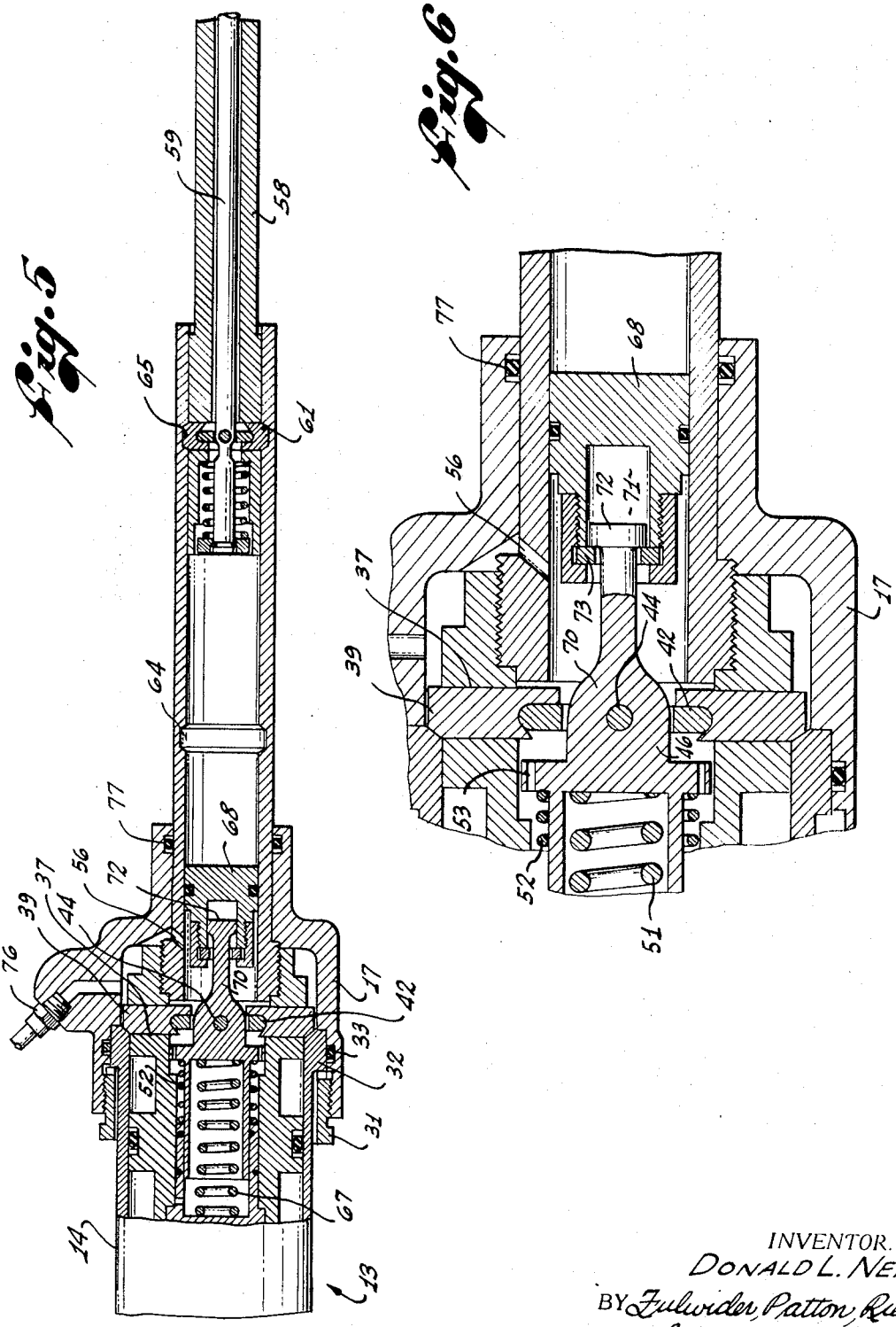

COMBINED HYDRAULIC AND CONTROL MANUAL OPERATOR

SUMMARY OF THE INVENTION

A combined hydraulic and manual operator having a hydraulic actuating piston for effecting normal movements of the operator in opposite direction and which provides for release of the operator from the operating piston so that it may be moved to a further extended position beyond that to which it is moved by the actuating piston. The actuating piston has locking means in the form of locking segments operated by toggle links in a manner similar to that disclosed in the U.S. Pat. No. 2,744,501 to Chace et al. The operation of the actuating piston to retracted and extended position and its locking in these positions is substantially known in the art.

An auxiliary holding element is provided, which is operable only when the operator is manually extended and retraction pressure is applied, for applying an additional holding pressure in the toggle head which locks the actuating piston in its extended position, whereby hydraulic operation with the operator manually extended is prevented.

The actuating piston has a hollow piston rod which extends through an end of the actuating cylinder and the operator is slidably received within the piston rod bore and is lockable therein in retracted and extended positions relative thereto. Mechanical locking is effected in substantially the same manner as the hydraulic locking, that is, by means of locking segments and toggle links, similar to the aforesaid Chace et al. patent. The operator is itself tubular with a central bore in which is disposed a locking-unlocking rod which carries the toggle links and which is biased toward locking position, a single set of locking segments being used on the rod operable into retracted and extended locking recesses within the piston rod.

It is therefore an object of the invention to provide an improved combined hydraulic and manual operator providing for normal movement to retracted and extended positions hydraulically and for manual movement to a further extended position while the hydraulic actuator is in its extended position.

A further object is to include in the combined operator a holding device for maintaining locking of the actuating piston in its extended position, regardless of the application of retraction pressure, while the operator is manually extended. Compactness is attained particularly by the concentric arrangement of the locking and unlocking rod, the operator and the piston rod whereby in normal hydraulic operation these elements have the same axial extent and do not substantially increase the overall actuator diameter.

Other objects and features of the invention will be apparent to those skilled in the art from the detailed description.

BRIEF DESCRIPTION OF THE DRAWING

FIG. 2 is a longitudinal sectional view of the operator with the parts in locked, retracted position;

FIG. 3 is a partial view similar to FIG. 2 showing the hydraulic actuator in its extended, locked position;

FIG. 5 is a partial view showing the operator locked in its manually further extended position; and FIG. 6 is a detailed sectional view showing the operation of the holding means to prevent release of the hydraulically extended lock.

DETAILED DESCRIPTION

Figure 1:
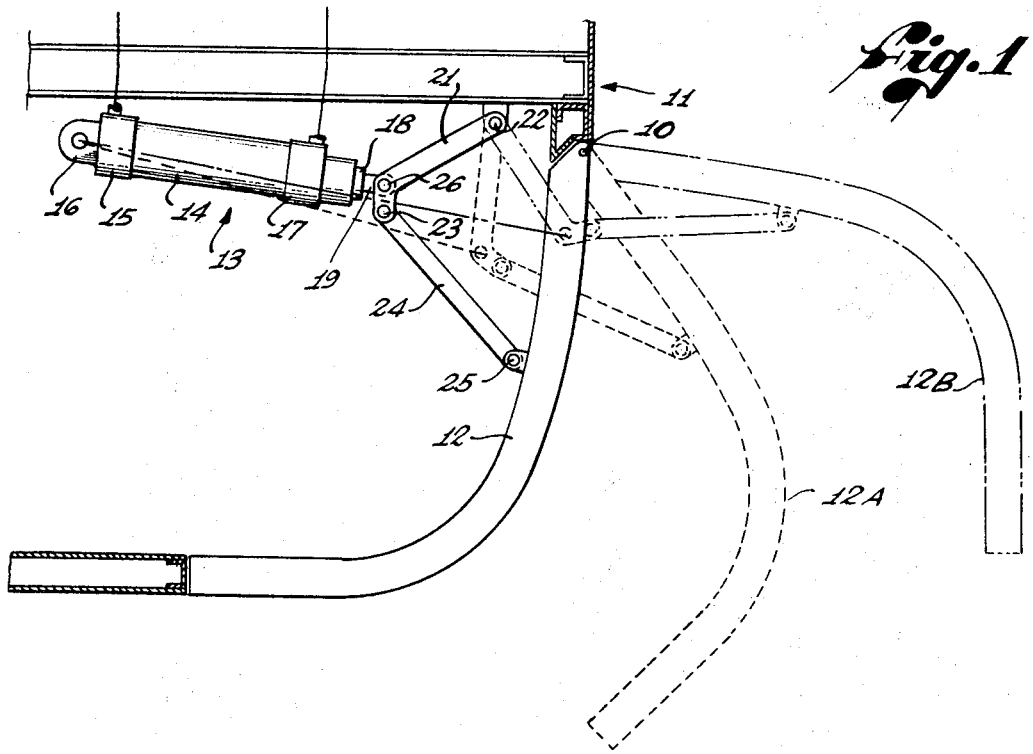
FIG. 1 is a substantially diagrammatic representation of the operator of the present invention applied to operate an aircraft bomb bay door.

The combined hydraulic and manual operator of this invention is shown in but one of its many applications in FIG. 1 applied to the operation of an aircraft bomb bay door where the hydraulic actuator provides for normal, inflight opening and closing movements of the bomb bay door, while the manual movement to further extended position of the operator may be effected on the ground to open the bomb bay door to its fullest extent for loading and other access operations.

The aircraft frame in FIG. 1 is indicated generally at 11 having a bomb bay door 12 pivotally mounted thereto at 10. The bomb bay door is shown in full line position closed, in its dotted line position at 12A as it is opened in flight by operation of the hydraulic actuator, and in broken line position at 12B to which it may be manually moved on the ground.

The combined operator is indicated at 13 comprising a barrel cylinder 14 having a rear end cap 15 by which it is mounted for swinging movement through the opening in an end lug 16. A front end cap 17 on the cylinder has a piston rod 18 extending therethrough and in the piston rod 18 is concentrically mounted an operator 19 which moves hydraulically with the piston rod and which is manually movable relative thereto.

A bellcrank lever 21 has its longer arm pivoted at 22 to a fixed part and its shorter arm pivoted at 23 to a simple lever 24 which is pivoted to the bomb bay door at 25. The operator 19 is pivotally connected to the knee of the bellcrank lever 21 at 26. As the operator 19 is extended from the full line position of FIG. 1, the bomb bay door and the levers successively assume positions in dotted and broken lines to conform to the bomb bay door positions 12A and 12B. The arrangement shown in FIG. 1 represents one end of the left-hand door construction and duplicate equipment will be used for the other end and for the right-hand door.

Referring now to FIG. 2, the rear end cap 15 is mounted upon the rear end of the barrel 14 by means of a split collar 27 bearing against an integral end flange 28 on the barrel and the cap is sealed to the end flange at 29. Similarly, the front end cap 17 is connected to the front end of the barrel 14 by means of a split collar 31 bearing against an integral end flange 32 and is sealed thereto at 33. Inside the barrel 14 is mounted a hydraulic operating piston 34 sealed to the interior barrel wall at 35, and having weight lightening cutout grooves at 36.

The piston 34 has forward and rear radially extending slots 37 and 38 in which are slidably mounted forward and rear locking segments 39 and 41, respectively. Locking segments 39 and 41 are operated to their extended locking positions where they engage respectively the conical end surfaces of the end flanges 32 and 28,. FIG. 2 showing the segments 41 in engagement with the end flange 28 in locked retracted position. The segments 39 and 41 are moved by means of toggle links 42 and 43, respectively, which are pivotally carried by pins 44 and 45, substantially as shown in the aforesaid Chace et al. patent.

The pin 44 passes through a locking member 46 and the pin 45 passes through a locking member 47. The locking members 46 and 47 have opposed skirted portions which telescopically engage each other and are sealed together at 48. The outside telescoping sleeve is sealed to a bore through the piston 34 at 49. Springs 51 and 52 bias the locking members 46 and 47 away from each other, and they are adapted to be moved toward each other against the spring bias by unlocking pressure. Fluid communication ports are shown at 50, 53 and 54.

Figure 4:
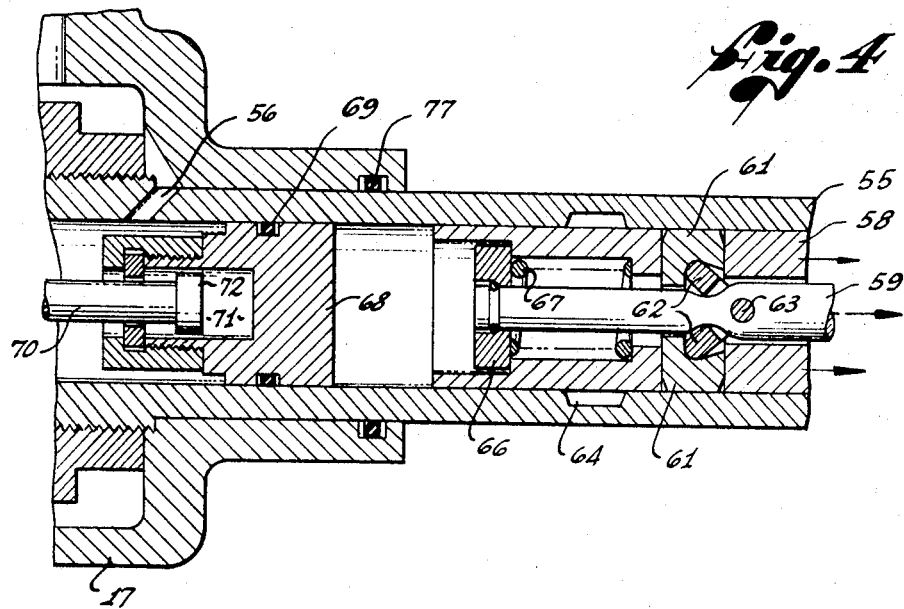
FIG. 4 is a detailed sectional view showing the operator manually unlocked and being manually moved to its further extended position.

A tubular piston rod 55 is rigidly connected to the forward end of the piston 34 and has a fluid passage port 56 therethrough. It passes through a central bore through the end cap 17 and is sealed therein at 77. The interior bore of the piston rod 55 at 57 receives the operator 58 in concentric, telescoping, sliding relation. The operator 58 is in turn tubular to receive in its central bore a locking-unlocking rod 59. The operator 58 has radially extending slots therethrough in which are disposed locking segments 61 operated by toggle links 62 connected to the locking-unlocking rod 59 at the pin 63. The bore 57 of the piston rod 55 is provided with a pair of locking notches 64 and 65 corresponding to the manually retracted and extended positions of the operator and adapted to receive the locking segments 61 at those positions, which are respectively illustrated in FIG. 2, retracted, and in FIG. 5, manually extended. A head 66 is ringed to the end of the rod 59 and a spring 67 applies its bias to the head to bias the rod 59 toward its locking position with the segments 61 extended, as shown in both FIGS. 2 and 5. The unlocked position of the segments 61 is illustrated in FIG. 4, which represents the manual movement of the operator from its retracted toward its manually extended position.

Slidably mounted in the bore 57 is a holding member 68 sealed in the bore at 69. While the operator 58 is latched in retracted position, the holding member 68 will be maintained in the position of FIG. 2 by its engagement with the end of the operator. It remains in this position, as in FIG. 4, while the operator is being manually extended, unless restricting fluid pressure is introduced, as illustrated in FIG. 6. The holding member 68 provides a lost-motion chamber 71 in which moves a head 72 mounted on a stem 70 rigid with the locking member 46. A ring 73 is secured to the back end of the holding member 68 and chamber 71 so as to be engageable with the head 72, as in FIG. 6.

Upon the end of the operator 58 is mounted a clevis 74 by which it may be connected to a part to be operated, such as the bellcrank connection at 26. The end of the rod 59 may be provided with a hole or similar engagement means 78 by which the rod 59 may be engaged by a claw in the clevis 74, or by an entirely separate tool to extend it from the locked position of FIG. 2 to the unlocked position of FIG. 4. After movement of the segments 61 out of the locking slots 64 and 65, the rod 59 can be released and the ends of the segments will simply slide against the bore in the operator, as illustrated at FIG. 4. When the segments come opposite one of the slots 64, 65, they will automatically drop therein under the action of the spring 67 on the rod 59.

The opposite ends of the actuating cylinder provided by the barrel 14 and end caps 15 and 17 may be pressurized by connection with a hydraulic system through ports 75 and 76 which communicate with the opposite ends of the actuating cylinder.

In operation, the parts are shown in FIG. 2 in their locked retracted position, which corresponds to the bomb bay door closed position of FIG. 1. For normal hydraulic movement of the parts into their first extended position, pressure is introduced into the port 75, while the port 76 is connected to the reservoir. This pressurizes the entire area of the main piston at its rear and also pressurizes the locking member 47 for movement against its spring bias toward the right, as viewed in FIG. 2, into its unlocking position, shown in FIG. 3. This movement of the locking member collapses the toggle links 43 and permits the segments 41 to move radially inwardly into the FIG. 3 position. The piston 34 now moves toward its extended position, shown in FIG. 3, at which point the locking segments 39 will move radially outwardly into engagement with the end of the flange 32, as shown, the toggle links 42 moving over center as the locking member 46 moves toward the right relative to the piston 34 into the position of FIG. 3. Movement of locking member 46 is effected under the action of its biasing spring and hydraulic pressure through ports 45, 50. In this movement, the head 72 moves into the chamber 71 relatively to the holding member 68 which remains in place against the end of the operator.

To hydraulically retract the operator from the position of FIG. 3 to that of FIG. 2, the port 76 is pressurized, while the port 75 is connected to reservoir. This applies pressure to the locking member 46 to move it against its spring bias into the unlocking position of FIG. 2, breaking the toggle links 42 and permitting the segments 39 to move radially inwardly to release the end of the barrel flange. The locking member 46 moves toward the left relative to the piston 34, and the head 72 simply moves to the end of the chamber 71 without moving the holding member 68. Pressure from the port 76 is applied to the piston annulus outside the piston rod 55 and this moves the main piston 34 to the retracted position of FIG. 2. When in the retracted position of FIG. 2, the locking segments 41 move outwardly into locking position by action of the toggle links 43 as the locking member 47 moves toward the left relative to the piston 34 under the action of both its spring bias and the pressure applied to the end annulus through the passages 53. The above-described operation is for normal hydraulic movement of the operator by the main actuating piston 34.

A further manual extension is secured from the hydraulically extended position of FIG. 3. This is done by moving the rod 59 outwardly by a tool engaging in its opening 78 and bodily moving the operator from its retracted position of FIG. 2 into its extended position of FIG. 5. As the rod 59 moves outwardly, it collapses the toggle links 62 to permit the segments 61 to move inwardly, and as soon as the segments 61 leave the locking notch 64, the rod may be released and the ends of the segments ride against the bore 57 as the operator is manually moved to its extended position. When in the position of FIG. 5, the segments 61 will be snapped into the locking notch 65 by the action of spring 67 on the rod head 66.

To manually return from the extended position of FIG. 5 to the retracted position of FIG. 3, the rod 59 is again pulled outwardly to unlock the segments 61 from the locking notch 65, whereupon the operator 58 is manually moved into the retracted position where the segments 61 will engage in the locking notch 64, again under the bias of the spring 67. In this manual movement of the operator to its further extended position, the holding member 68 remains in the position of FIGS. 3 and 5.

The operation of the holding member 68 to prevent unlocking of the main piston 34 should retracting pressure be applied to the port 76 during manual extension is illustrated in FIG. 6. If, in the manually extended position of FIG. 5, retracting pressure should inadvertently be applied to the port 76, the operator is prevented from moving in hydraulic retraction by retention of the locking member 46 in locking position. As pressure is applied through the port 76, it pressurizes the entire diameter of the holding member 68, through the passage port 56, thereby moving the holding member 68 to the right within the bore 57 until the ring 73 engages the head 72 on the stem 70 integral with the locking member 46. The hydraulic force on the member 68, added to the locking bias from the springs 51 and 52, overcomes the unlocking hydraulic pressure on the locking member 46, thereby holding the member 46 in the locked position of FIG. 6 and preventing hydraulic retraction of the operator while it is in its manually extended position. When the operator is manually returned to its retracted position, the end of the operator engages the holding member 68, as in FIG. 3, and holds it in inoperative position with the head 72 free to move within the chamber 71. The sole function of the holding member 68 is to prevent hydraulic retraction while the operator is manually extended, and it is only when pressure is inadvertently applied in a hydraulic retracting direction through the port 76 that the holding member 68 becomes functional.

While a certain preferred embodiment of the invention has been specifically illustrated and described, it will be understood that the invention is not limited thereto, as many variations will be apparent to those skilled in the art.

I claim:
1. A combined hydraulic and manual operator comprising:
a hydraulic operating cylinder;
an operating piston in said cylinder;
a piston rod extending from said piston through an end of said cylinder;
means for oppositely pressuring said cylinder to move said piston into extended and retracted positions;
means for locking said piston in its extended and retracted positions including means for automatically releasing said locking means upon the application of the appropriate pressurizing means;
an operator carried by said piston rod for normal movement hydraulically therewith into extended and retracted positions;
means connecting said operator to be movable manually relative to said piston rod into a further extended position; and means for locking the operator relative to the piston rod in both manually extended and retracted positions.

2. A combined hydraulic and manual operator as defined in claim 1 and including:
locking-unlocking means carried by said operator for manually releasing the means for locking the operator relative to the piston rod.

3. The combined hydraulic and manual operator as defined in claim 1 in which said piston rod and operator are concentrically mounted for common movement as a unit during hydraulic operation.

4. The combined hydraulic and manual operator defined in claim 2 in which:
said piston rod operator and locking-unlocking means being concentrically mounted for movement as a unit in hydraulic operation, for movement of the operator and the locking-unlocking means as a unit in manual operation, and for movement of the locking-unlocking means relative to the operator to effect its locking and unlocking functions.

5. The combined hydraulic and manual operator as defined in claim 1 in which:
said piston rod being cylindrical;
said operator being mounted in the piston rod bore for normal movement therewith; and
said operator locking means comprises locking segments carried by the operator and movable into locking grooves in the bore of the piston rod.

6. The combined hydraulic and manual operator of claim 5 including:
said operator being tubular in form;
a rod extending through said operator, said rod by its position relative to the operator determining the position of said locking segments; and
means biasing said rod relative to the operator toward its locking position.

7. The combined hydraulic and manual operator of claim 1 including:
holding means for preventing unlocking of said means for locking the piston in its extended position while the operator is manually further extended.

8. The combined hydraulic and manual operator defined in claim 7 including:
said holding means being movable on the application of a retracting pressure to the cylinder while the operator is manually extended, to engage and hold the piston locking means against unlocking movement by said retracting pressure.

9. The combined hydraulic and manual operator defined in claim 8 in which:
said piston locking means ordinarily moving relative to said holding means with a lost-motion connection thereto except in the condition of the application of retracting hydraulic pressure while the operator is in manually further extended position.

10. The combined hydraulic and manual operator defined in claim 9 in which:
said holding member, from the application of pressure thereto, exerting on said locking means a force which, added to a locking bias on said locking means, will be greater than the unlocking force exerted directly by said retracting pressure.

PO-1050
(5/69)

UNITED STATES PATENT OFFICE
CERTIFICATE OF CORRECTION

Patent No. 3,583,288  Dated June 8, 1971

Inventor(s) DONALD L. NEPP

It is certified that error appears in the above-identified patent and that said Letters Patent are hereby corrected as shown below:

Column 4, line 64, after "oppositely" delete "pressuring" and insert therefor --pressurizing--.

Signed and sealed this 9th day of November 1971.

(SEAL)
Attest:

EDWARD M. FLETCHER, JR.  ROBERT GOTTSCHALK
Attesting Officer  Acting Commissioner of Patents